Feb. 5, 1963    P. G. VICARD    3,076,480
FLUID CONDUITS
Filed March 30, 1960    2 Sheets-Sheet 1
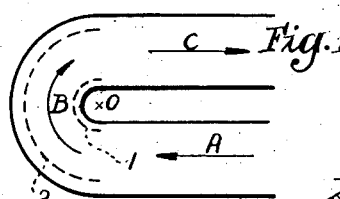
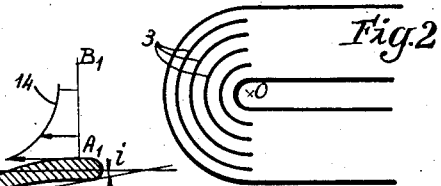
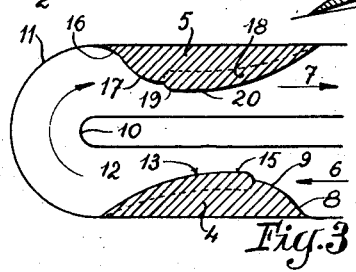
INVENTOR
Pierre Georges Vicard
BY
ATTORNEYS Feb. 5, 1963    P. G. VICARD    3,076,480
FLUID CONDUITS
Filed March 30, 1960    2 Sheets-Sheet 2
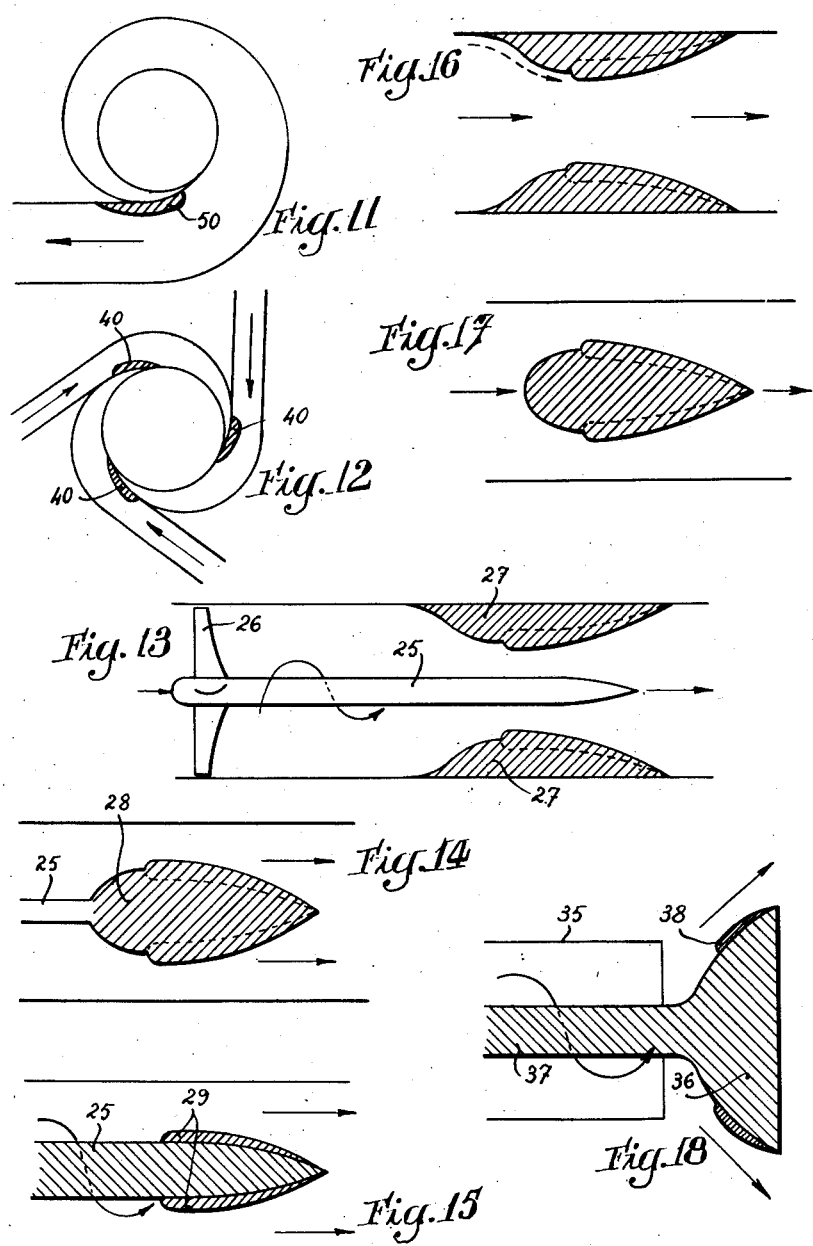
INVENTOR
Pierre Georges Vicard
BY Alexander Norvell
ATTORNEYS United States Patent Office 3,076,480
Patented Feb. 5, 1963

3,076,480
FLUID CONDUITS
Pierre Georges Vicard, 15 Cours Eugénie, Lyon, France
Filed Mar. 30, 1960, Ser. No. 18,615
Claims priority, application France Apr. 9, 1959
3 Claims. (Cl. 138—39)

The present invention relates to the flow of fluids (this term including gases and liquids) along non rectilinear paths, as for instance in the curved portions or bends of conduits.

It is a well known fact that eddies occur in conduits whenever the radius of curvature of the conduit varies, and more particularly at the inlet and at the outlet of bends, elbows or like portions of relatively short radius. In the case of conduits of large cross section and with high velocities of the fluid, these eddies constitute an important disadvantage, more particularly on account of the loss of power which they entail.

In accordance with the present invention when the flow of a fluid passes from a rectilinear path (straight-line flow) to a curved path (rotating flow), the fluid streams are so directed that the rotating flow begins with a predetermined velocity on each radius of rotation, the excess of dynamic pressure being transformed into static pressure where the initial velocity is to be reduced, while conversely, when the flow passes from the curved path (rotating flow) to the rectilinear path (straight-line flow), the fluid streams are given a uniform dynamic pressure equal to or even higher than the maximum total pressure of rotation which prevails in the rotating flow (the said total pressure being equal to the sum of centrifugal pressure and of static pressure) and this dynamic pressure is partially transformed into static pressure until there is obtained a uniform dynamic pressure equal to the dynamic pressure of the initial straight line flow, in such a manner that in the rectilinear portion of the conduit the fluid has again the same static pressure and the same dynamic pressure at any point of the cross section. The best results are obtained with this method when the rotating flow is of the so-called irrotational type, wherein the total rotational pressure is uniform throughout the cross-section of the flow, whereby the latter is perfectly stable.

In accordance with another feature of this invention the flow conditions at the inlet and at the outlet of the curved path are fulfilled by means of vanes which determine one or several convergent and divergent passages of the Venturi type which transform the dynamic pressure of the fluid into static pressure without any substantial loss of power, in an amount which varies in proportion to the radius of rotation.

In addition to the said convergent divergent passages, or as an alternative therefor, there may be disposed at the inlet and at the outlet of the curved path vane elements having the shape of the low pressure side of an aircraft wing.

In the annexed drawings:

FIG. 1 diagrammatically illustrates a portion of a conduit comprising a bend at 180°.

FIG. 2 shows a known solution for reducing the formation of eddies in the bend.

FIG. 3 shows how the same problem may be solved according to a first embodiment of the present invention.

FIG. 4 is a diagrammatical cross-section of an aircraft wing showing the air velocities on the low-pressure side thereof.

FIGS. 5 and 6 are graphic representations of the pressure conditions prevailing respectively in a straight-line flow and in a rotating flow of the irrotational type.

FIG. 7 is a view similar to FIG. 3, but showing another embodiment of the present invention.

FIGS. 8 to 12 diagrammatically illustrate an application of this invention to the inlet or to the outlet of a volute.

FIGS. 13 to 15 show how this invention may be applied to the passage from a helical or spiral flow to a uniform straight line flow.

FIGS. 16 and 17 show the application of this invention to the prevention of eddies along the wall of a Venturi passage or the like.

FIG. 18 illustrates how this invention may be applied to a diffusing device at the end of a conduit.

FIG. 19 shows this invention as applied to the case of a blower provided with an enlarged annular outlet.

Referring to the drawing, FIG. 1 shows a bend at 180° in a fluid conduit. The fluid flows as indicated by arrows A, B and C, arrow A corresponding to the initial straight-line flow before the bend, arrow B to the rotating flow in the bend, and arrow C to the subsequent straight-line flow after the bend. The fluid reaches the bend under a uniform velocity, which means that its dynamic pressure is uniform on any transverse section of the conduit.

It would seem at first sight that in the bend the same kind of flow would take place, as indicated by the streams or trajectories 1 and 2. But considering the successive cylindrical fluid layers co-axial to the geometrical axis O of the bend, each one is submitted to the centrifugal pressure of the inner ones and it transmits this pressure to the next layer together with its own additional elementary centrifugal pressure. The centrifugal pressure is therefore low on an inner layer such as 1 and high on an outer layer such as 2. This tends to displace the fluid flow outwardly with respect to the axis of the bend and causes the formation of eddies with the resultant power losses.

In conduits of large dimensions it has already been proposed to prevent the formation of eddies in the bends by positively guiding the successive fluid layers by means of guiding partitions 3 (FIG. 2) substantially co-axial to the geometrical axis O of the bend. By disposing a sufficiently large number of such partitions close to each other, the fluid flow is divided into successive films of negligible thickness and the formation of eddies is prevented. But this arrangement of curved partitions accurately disposed at a small distance from each other is delicate and expensive, and moreover it entails substantial friction losses owing to the considerable surface of contact between the stationary partitions and the fluid layers or films which run between the latter.

In accordance with the present invention (FIG. 3) there is provided at the inlet of the bend a first vane assembly 4 and at the outlet thereof a second vane assembly 5. Each vane assembly is disposed against the outer side of the conduit (with respect to the axis O of the bend) so as to determine with the inner side thereof a convergent-divergent passage for the fluid which flows as indicated by arrows 6 and 7.

The first or inlet vane assembly 4 is intended to cause the fluid to flow in the bend according to the irrotational motion. For this purpose this vane assembly 4 comprises a converging portion 8 so arranged that the fluid velocity (or dynamic pressure) in the neck portion 9 of the fluid passage is substantially uniform and equal to the maximum velocity in the bend, i.e. to the velocity along the inner side 10 of the conduit where the centrifugal pressure is zero. Stated in other words the dynamic pressure along the inner side 10 is equal to the dynamic pressure in the neck portion of the inlet passage 6. On the other hand along the outer side 11 of the bend, where the velocity should be at a minimum and the static pressure at a maximum to balance the centrifugal pressure exerted by the inner layers or streams, a quite large fraction of the dynamic pressure in the neck 9 is transformed into static pressure in the diverging portion of the inlet passage 6.

It has been found that this progressive transformation of the dynamic pressure in the neck portion of the inlet passage, into static pressure in proportion of the radius of rotation of the successive fluid layers was best obtained by giving to the diverging portion of the first vane assembly 4 the contour of the low-pressure side of an aircraft wing, as indicated at 13.

Experiments effected on aircraft wing models have shown that the air flow on the low pressure side (upper side) of such a wing takes place in an irrotational manner with respect to the advancing wing. Considering (FIG. 4) an aircraft wing with an incidence $i$, if the air velocity is plotted horizontally for the points situated on a perpendicular $A_1B_1$ to the upper contour of the wing, there is obtained a curve 14 which is characteristic of the irrotational motion, the air velocity decreasing as the point under consideration is farther from the wing. This curve corresponds exactly to the conditions to be obtained in the secondary neck portion 15 (FIG. 3) between the wing-shaped element 13 and the inner side 10 of the conduit. Further, if the velocity of the fluid along the inner side 10 of the conduit in the secondary neck portion 15 is equal to the uniform velocity which prevails in the primary neck portion 9, the transformation of dynamic pressure into static pressure takes place in the appropriate proportion to balance centrifugal pressure in the successive fluid layers in the bend.

The second or outlet vane assembly 5 also comprises a converging portion 16, a primary neck portion 17 wherein the dynamic pressure or velocity of the fluid should be uniform, and a diverging portion with an additional element 18 having the shape or contour of the low pressure side of an aircraft wing. This element determines a rounded protruding ridge 19 and a secondary neck portion 20 wherein the lowest velocity (i.e. the velocity along the inner side 10 of the conduit) should be equal to the uniform velocity in the primary neck portion 17. When this is obtained the dynamic pressure of the incoming fluid is partially transformed into static pressure and at the outlet end of the vane assembly the conditions of the straight-line flow, namely uniform dynamic and static pressure in each section, are again fulfilled without any noticeable head losses.

FIGS. 5 and 6 illustrate the preceding explanations. In these figures the abscissae represent the transverse width of the conduit, i.e. the width thereof in the plane of FIG. 3, respectively for the straight-line flow (FIG. 5) and for the rotating flow (FIG. 6), points 10 and 11 corresponding respectively to the inner side and to the outer side. In the straight-line flow the static pressure S and the dynamic pressure D (corresponding to the fluid velocity) are both uniform and their sum or total pressure T is also uniform; there is of course no centrifugal pressure. In the rotating flow (FIG. 6), which is of the irrotational type, the dynamic pressure D is at a minimum on the outer side 11 and at a maximum on the inner side 10; the centrifugal pressure C on the contrary is zero on the inner side 10 and maximum on the outer side 11, the total pressure T remaining uniform and unchanged (neglecting the minor head losses). It has been supposed that the static pressure S had wholly been transformed into dynamic pressure. If such were not the case, the residual static pressure would still be figured by a horizontal line as in FIG. 5, but with a much lower ordinate.

In the embodiment illustrated in FIG. 7 the inlet vane assembly 40 only comprises a single element having the contour of the low pressure side of an aircraft wing and this element is disposed on the inner side 10 of the conduit, instead of the outer side as in the embodiment of FIG. 3. The outlet vane assembly 50 is also formed of a single element disposed on the inner side of the conduit and having the contour of the low-pressure side of an aircraft wing. The first vane assembly 40 transforms a portion of the static pressure of the incoming fluid into dynamic pressure in the vicinity of the outer side 11 (and possibly a portion of the dynamic pressure into static pressure in the vicinity of the inner side 10) and if this vane assembly has been appropriately determined, the distribution of the various fluid pressures in any section of the bend may be as illustrated in FIG. 6. The second vane assembly 50 restores the conditions of the straight-line flow as illustrated in FIG. 5.

FIGS. 8 to 11 illustrate the application of the invention to the connection between a rectilinear conduit and a volute such as, for instance, the volute of a centrifugal apparatus (blower, cyclone separator, air engine, &c.). FIGS. 8 and 9 correspond to the case wherein the fluid flows from the conduit into the volute (tangential inlet). The straight-line flow is then transformed into a rotating flow of the irrotational type and for this purpose there is used a vane assembly 4 (FIG. 8) or 40 (FIG. 9) respectively similar to the inlet vane assembly illustrated in FIG. 3 or in FIG. 7. FIGS. 10 and 11 correspond to the case wherein the fluid flows from the volute into the conduit (tangential outlet). Here again there is provided at the outlet of the volute a vane assembly 5 (FIG. 10) or 50 (FIG. 11) respectively similar to the outlet vane assembly of FIG. 3 or of FIG. 7. The invention thus permits of avoiding the formation of eddies as for instance at the inlet of a centrifugal separator or at the outlet of a blower. As illustrated in FIG. 12, the invention may as well be applied in the case of a plurality of tangential inlets (or, of course, of tangential outlets). The volutes are preferably of logarithmic shape.

In FIG. 13 a tube or rod 25 is disposed axially in the fluid conduit and radial vanes 26 are provided at the front end of this tube or rod to cause the fluid to rotate about the latter or, in other words, to flow helically. The normal straight-line flow is to be resumed at the rear end of the axial rod or tube 25. For this purpose there is provided an annular vane assembly 27 having an axial section similar to the section of the outlet vane assembly 4 of FIG. 3. Here again centrifugal pressure of the fluid rotating about the tube or rod is transformed into dynamic pressure and the excess of dynamic pressure is transformed into static pressure in such a manner that the outlet of the annular vane assembly the conditions of normal straight-line flow are restored without any noticeable head loss.

The arrangement of FIG. 13 is more particularly applicable to the case of blowers, turbines, pumps and like apparatus of the axial type. It may be supposed, for instance, that the vanes 26 form the rotor of a blower, 25 being the driving shaft thereof.

In FIG. 14 the same result is obtained by means of a vane assembly 28 carried by the axial rod or tube 25, the section of this vane assembly being also of the kind illustrated in FIG. 3. FIG. 15 shows an embodiment wherein the vane assembly 29 carried by the downstream end of the axial rod or tube 25 is of the type of FIG. 7.

FIG. 16 illustrates another case of application of the present invention. A fluid conduit comprises a Venturi passage 30 for any purpose, not illustrated. Considering a fluid stream 31 close to the conduit wall, it will be observed that its initially rectilinear path is deviated first in one direction, and thereafter in the other. In other words the initial straight-line flow becomes a rotating flow for the fluid stream under consideration, which may cause formation of eddies with the resultant head losses. This is easily avoided in accordance with this invention by conforming the section of the Venturi as in the case of FIG. 3, i.e. by providing an additional vane element 32 having the shape of the low-pressure side of an aircraft wing. This additional element determines a secondary neck portion and the conditions to be fulfilled are as in the case of FIG. 3, the lowest velocity being situated on the axis of the conduit.

FIG. 17 only differs from FIG. 16 by the fact that the Venturi, instead of being annular, is in the form of an axial member 33 which determines an annular convergent and divergent passage. Here again there is provided an additional element 34 having the shape of the low-pressure side of an aircraft wing.

In FIG. 18 a fluid is to be diffused in a given space. For this purpose the fluid is caused to flow helically through a conduit 35 provided at its free end with a flaring diffuser 36 carried by an axial rod 37. Rotation of the fluid in the conduit is normally of the irrotational type as this always tends to occur whenever a fluid is free to rotate in a cylindrical space. By providing on the diffuser a vane assembly 38 of proper shape (in the present case the section of the said vane assembly is similar to the section of the outlet element 50 of FIG. 7), the conditions of the straight-line flow may be obtained and diffusion of the fluid is effected with a minimum of head losses.

FIG. 19 diagrammatically illustrates a centrifugal blower comprising a rotor 41 and an annular volute 42 of larger width. Here again the fluid streams from the centrifugal rotor are deviated laterally where the cross-section of the flow widens. In the known constructions this widening or expansion of the fluid flow is merely taken into account by providing some sort of intermediate flaring passage between the periphery of the rotor and the volute, as indicated in dotted lines at 43, but this disposition fails to prevent head losses resulting from the curved path of the outer streams of the fluid. In accordance with the present invention this disadvantage is avoided by disposing on the wall of the flaring intermediate passage 43 a vane element 44 having the contour of the low-pressure side of an aircraft wing.

I claim:

1. A device to prevent head losses in a fluid conduit at the passage from a first substantially straight-line section to a second section curved about an axis of curvature, or from a first section curved about an axis of curvature to a second substantially straight-line section, comprising a vane assembly disposed at the end of said first section which joins said second section on the side of said conduit farthest from said axis of curvature to determine with the side of said conduit nearest to said axis of curvature a convergent-divergent passage of the Venturi type to transform in a fluid flowing through said conduit the conditions of dynamic pressure and of static pressure from those of a rectilinear uniform velocity flow in said first section to those of an irrotational flow in said second section.

2. In a device as claimed in claim 1, an additional element having the contour of the low pressure side of an aircraft wing, disposed on said vane assembly on the portion thereof corresponding to the diverging portion of said passage to produce a secondary neck in said convergent divergent passage.

3. A device to prevent head losses in a fluid conduit at the passage from a first substantially straight-line section to a second section curved about an axis of curvature, or from a first section curved about an axis of curvature to a second substantially straight-line section, comprising a vane element having the contour of the low-pressure side of an aircraft wing, disposed at the point of passage on the side of said conduit nearest to said axis of curvature.

References Cited in the file of this patent

UNITED STATES PATENTS 1,582,369    Aske _____ Apr. 27, 1926

FOREIGN PATENTS 98,154    Sweden _____ Feb. 20, 1940